United States Patent [19]

Honey et al.

[11] Patent Number: 4,768,334
[45] Date of Patent: Sep. 6, 1988

[54] TRACTOR MOUNTED SWATHER

[75] Inventors: Gregory J. Honey; Glenn R. Honey, both of Bracken, Canada

[73] Assignee: Honey Bee Manufacturing Ltd., Bracken, Canada

[21] Appl. No.: 62,277

[22] Filed: Jun. 15, 1987

[51] Int. Cl.⁴ ............................................. A01B 73/00
[52] U.S. Cl. ..................................... 56/228; 56/15.2; 56/15.6
[58] Field of Search ....................... 56/228, 14.9, 15.1, 56/15.2, 15.6, 16.2

[56] References Cited

U.S. PATENT DOCUMENTS

| | | | |
|---|---|---|---|
| 3,021,658 | 2/1962 | Mitchell | 56/15.1 |
| 3,958,400 | 5/1976 | Sorensen | 56/15.2 |
| 4,384,445 | 5/1983 | McIlwain | 56/228 |
| 4,441,305 | 4/1984 | Lippl | 56/15.6 |
| 4,658,572 | 4/1987 | Honey | 56/228 |
| 4,682,464 | 7/1987 | Johnson | 56/14.9 |

FOREIGN PATENT DOCUMENTS 1151431 8/1982 Canada ................................. 56/228

Primary Examiner—Douglas Hart
Attorney, Agent, or Firm—Albert J. Jeffers

[57] ABSTRACT

A swather including at least a front swather head and one side swather head having mountings for mounting the front head on a tractor for support by the front of the tractor and for mounting the side head in a manner to permit the rear of the tractor to support at least the inner end of the side swather head. The mountings are such that they permit the heads to be adjusted to a number of different travel modes. In one mode of travel, the side head can be moved to a position trailing the tractor and the front head is carried in a raised position at the front of the tractor. The movement of the side head can be accomplished from within a cab of the tractor. Another mode of transport is possible by providing a mechanism for demounting and carrying the front head. For this mode the side head is moved to the trailing position as just described, and the front head is pulled lengthwise behind the side head. In yet another mode of transport, the side head is also readily demountable from the tractor and carried on a separate device so that both heads can be pulled one behind the other by a road vehicle, such as a truck.

31 Claims, 6 Drawing Sheets

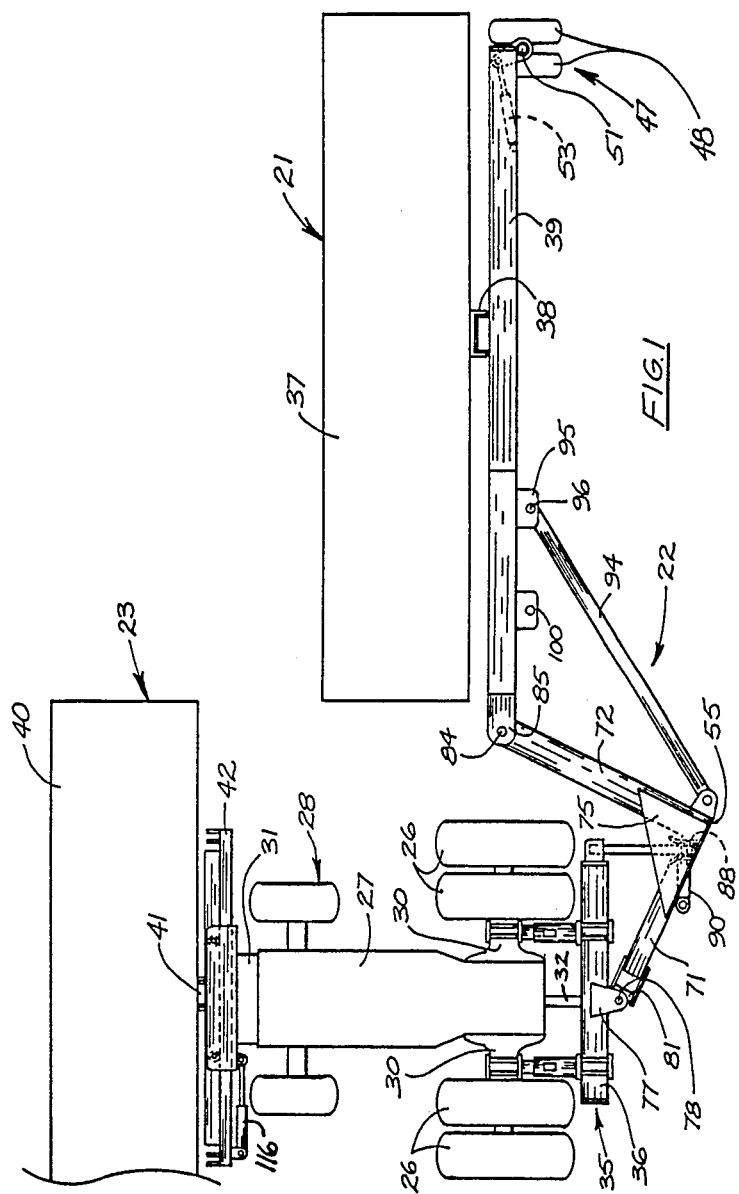

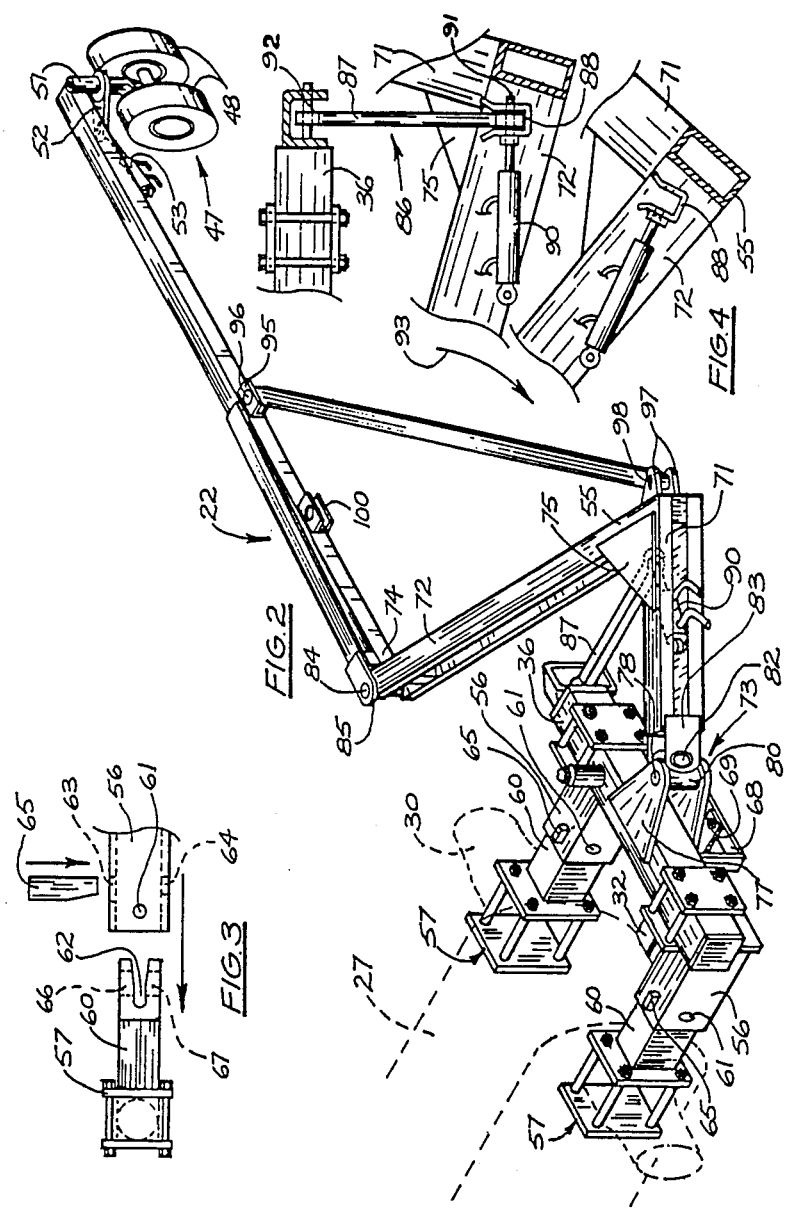

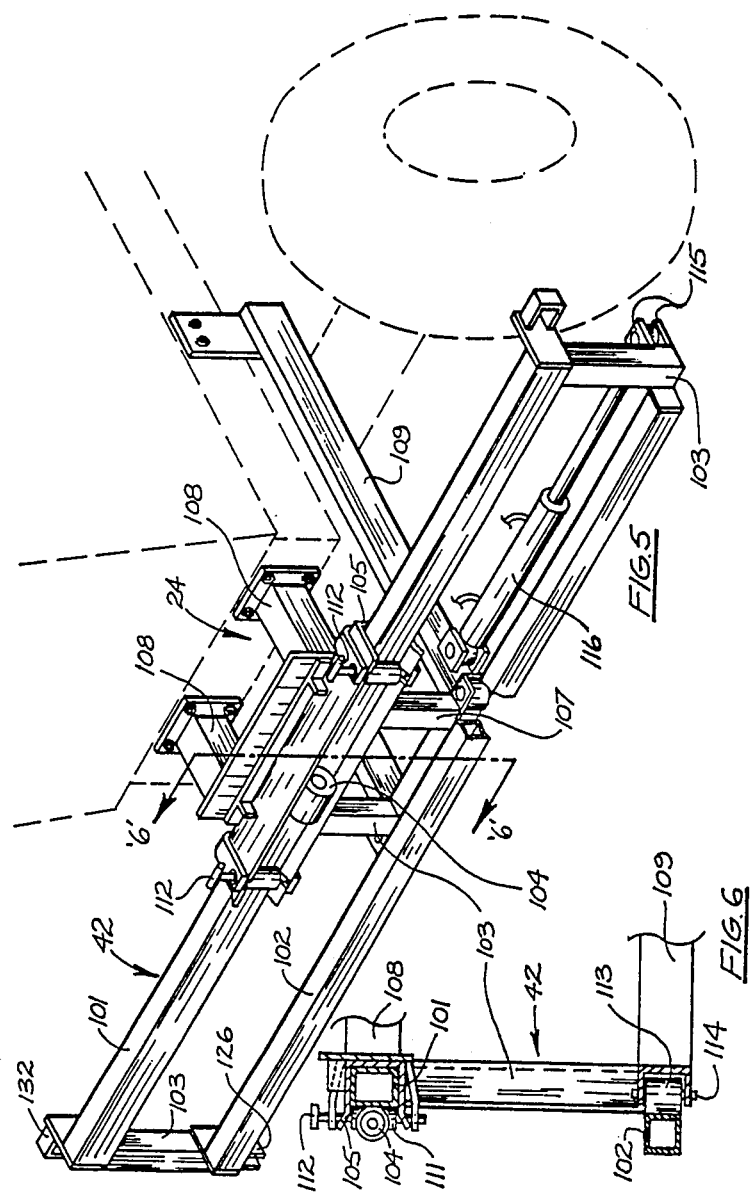

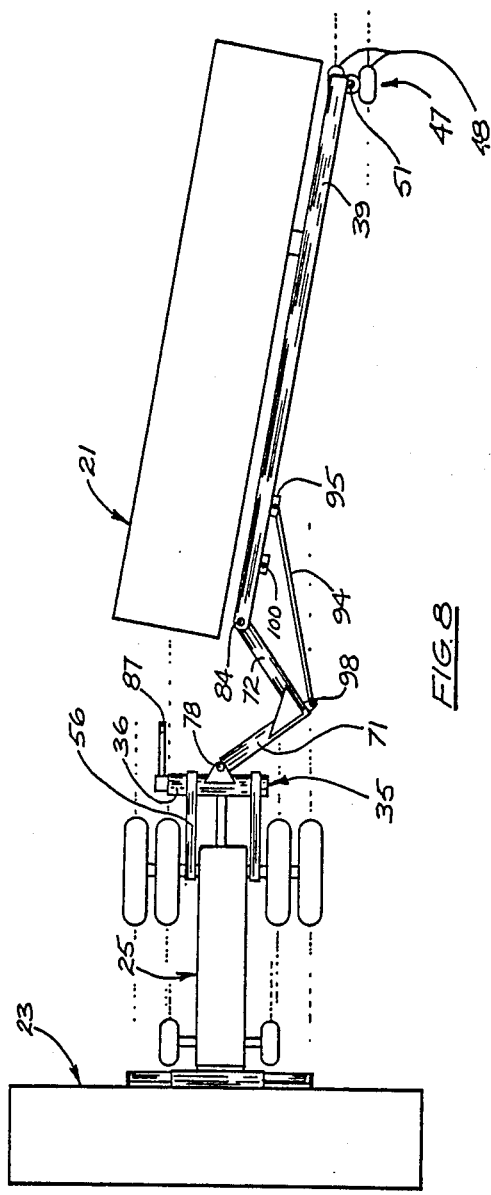

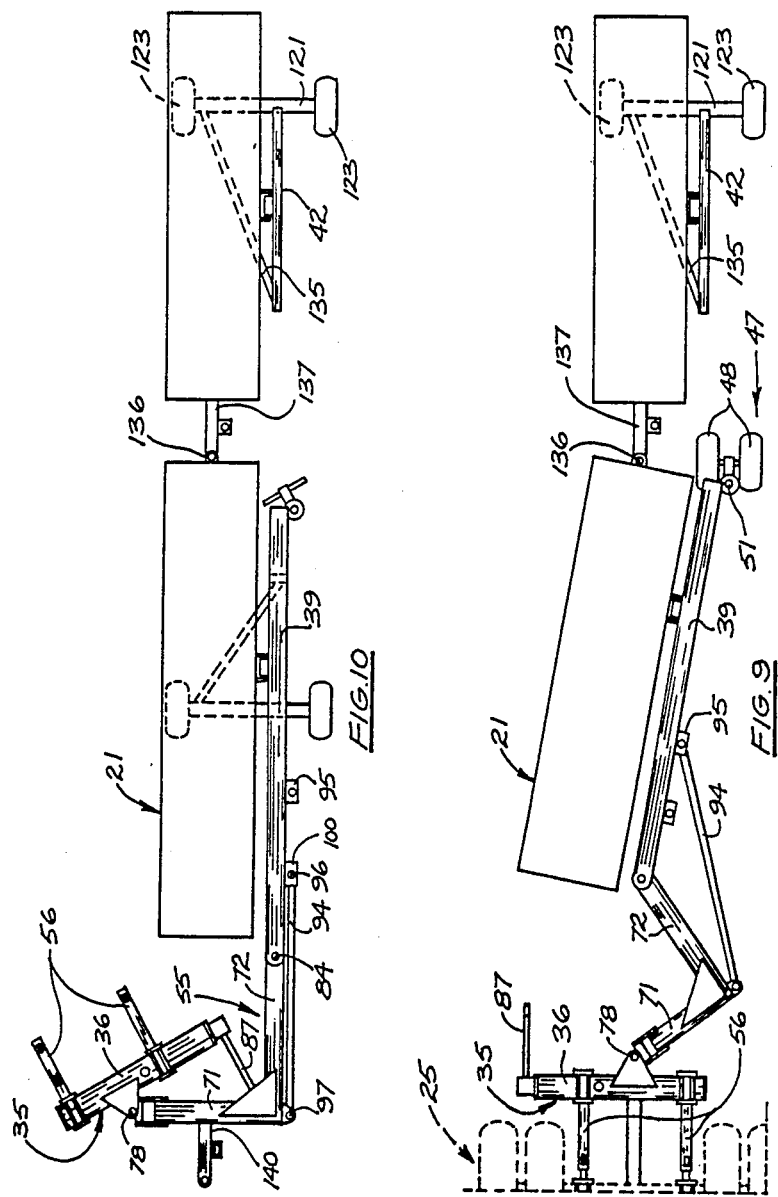

TRACTOR MOUNTED SWATHER

BACKGROUND OF THE INVENTION

1. Field of the Invention

This invention relates to a swather of the type used in harvesting grain crops, and more particularly to a type of swather which includes at least two swather heads and can be mounted directly on a conventional farm tractor.

2. Description of the Prior Art

Multi-head swathers have been developed in order to increase the efficiency in swathing grain, and because of the considerable width of such implements when in the working condition, it has been necessary to design such swathers so that the heads can be moved to a narrowed transport condition. While self-propelled swathers, such as the type shown in our Canadian Reissue Patent No. 1,183,355, granted Mar. 5, 1985, are available, there is a need for a swather of the multi-head type which can be mounted on a conventional farm tractor. The tractor mounted type can be produced, of course, at a much lower cost, and make use, as a prime mover of the implement, of the conventional tractor which a farmer already owns. A tractor mounted swather of this type is shown in Canadian Patent No. 1,210,936, granted Sept. 9, 1986, to Gary W. Tiechrob, and assigned to Honeycrop Ltd., and our U.S. Pat. No. 4,658,572, granted Apr. 21, 1987. Although the earlier designs have proven to be efficient swathers, the mounting of both heads on a single frame has resulted in a excessive weight at the front of the tractor, which over a period of time, can cause undue wear to the front wheel suspension and steering system. Moreover, although the earlier embodiments have provided for a folding arrangement to permit at least the side swather to be positioned in a transport mode, it has been found that in many instances, the width of the front head, which remains in its working position for transport, results in awkward travel.

SUMMARY OF THE INVENTION

It is an object of the present invention to provide a swather which is capable of being mounted on a conventional farm tractor and which will provide good weight distribution on the tractor.

It is further object of the present invention to provide a tractor mounted swather which can be conveniently adjusted from a working position to a transport condition.

According to the present invention, there is provided a swather including a rigid drawing means which has a transverse member and forwardly projecting members connected to the transverse member and having connecting means at forward ends thereof for rigid connection to a frame portion of the tractor with the transverse member having an intermediate portion disposed behind the tractor. A side swather head is also provided for mounting at one side of the tractor and, in a working position, projecting from the tractor at a location forward of the transverse member and perpendicular to the direction of travel. The swather head includes an elongated rigid frame which is supported at its outer end by ground engaging means and has a connection member for connecting an inner end thereof to the transverse member of the drawing means. The connection member normally supports the inner end of the frame and retains the side swather head in the working position. The connection member includes a pair of legs rigidly connected at inner ends and projecting at an angle relative to each other. One of the legs is connected at the outer end thereof to the intermediate portion of the transverse member and extends towards the side of the tractor from which the swather head projects, the other leg of the connection member extends forward from its connection with the one leg and is connected at its outer end to the inner end of the frame of the side swather head for proving the support for the inner end of the swather head.

More specifically, pivotal connection means is provided between the outer end of the one leg and the intermediate portion of the transverse member for allowing turning of the connection member relative to the transverse member about a substantially vertical axis. Additional connection means is provided for detachably connecting the connection member to the transverse member for normally preventing pivoting of the turning member relative to the transverse member.

In the illustrated embodiment of the invention, there is further provided a front swather head with means for detachably connecting the front swather head in front on the tractor with one end of the front swather head substantially aligned with the inner end of the side swather head, the means connecting the front swather head to the tractor being separate from the drawing means for mounting the side swather head.

In the present invention, the rigid drawing means and the connection member allow the weight of the side swather head to be carried by the rear of the tractor while the separate connecting of the front head provides the sole support for the front head at the front of the tractor.

By detaching the additional connection means between the transverse member and the connection member so that the connection member can pivot about the vertical axis, the side head is allowed to turn to a mode of transport behind the tractor. In such a mode the front head can be left in its mounted position on the front of the tractor, and with the side head trailing, transport of the swather can be carried out for at least short distances and particulary on off-road movement.

There may be further provided a wheeled transport carriage which has an axle attachable to a sub-frame assembly of the front swather head so that the front head can be dismounted and carried on said carriage behind the side head in its transport mode for convenient travel over longer distances, and particularly on public roadways where width restrictions may exist.

BRIEF DESCRIPTION OF THE DRAWINGS

In the accompanying drawings, which show an embodiment of the invention, as an example:

FIG. 1 is a top plan view of an embodiment of the swather according to the present invention mounted on a conventional tractor with the side swather in a working position;

FIG. 2 is a prospective view of the mounting structure and main frame of the side swather head in a working position;

FIG. 3 is an enlarged side view of connecting means for attaching the drawing means to a frame portion of the tractor;

FIG. 4 is a enlarged top view of the additional connection means for connecting the connection member to the drawing means;

FIG. 5 is a perspective view of the structure for allowing detachable mounting of the front swather head on the tractor;

FIG. 6 is a cross sectional view of the front head mounting structure as seen from the line 6—6 of FIG. 5;

FIG. 8 is a top plan view showing the swather in one transport position;

FIG. 9 is a top plan view of the swather in another transport position; and

FIG. 10 is a top plan view of the swather in yet another transport position.

DESCRIPTION OF THE PREFERRED EMBODIMENT

Figure 7:
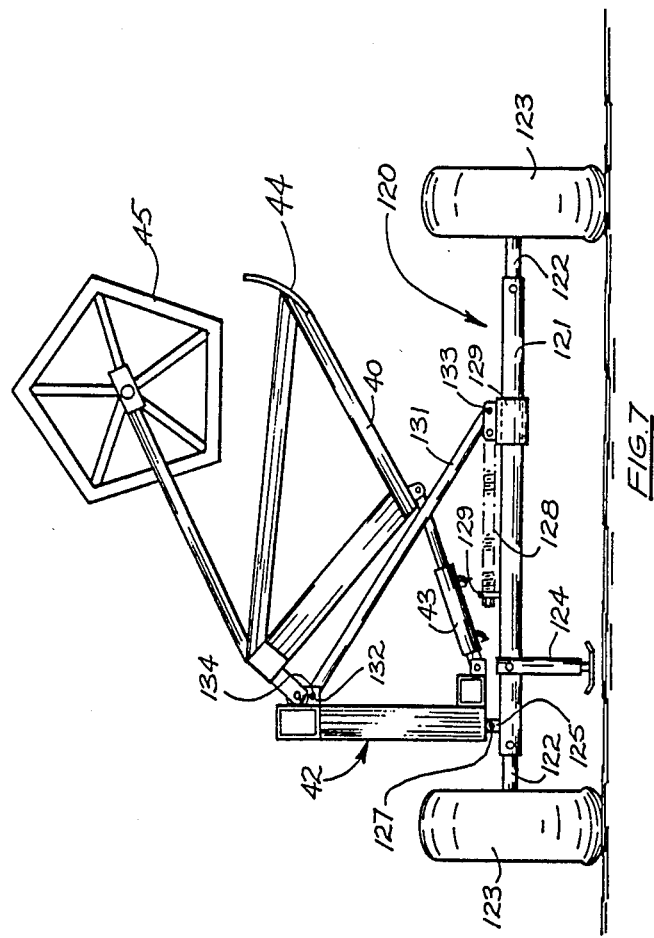
FIG. 7 is an end view of the front head mounted on the transport carriage.

Referring to FIG. 1, the reference number 20 generally denotes the swather of the present invention, and in the main, it consists of side swather head 21, a mounting means 22 for the side swather head 21, front swather head 23, and a mounting means 24 for the front swather head 23. The side and front swather heads 21 and 22 are shown mounted on a conventional farm tractor 25. The tractor 25 has a main body portion 27 mounted on rear wheels 26 and front steerable wheel system 28. The rear wheels are disposed at the opposite outer ends of rear axle 30. The main body portion 27 has a forward frame portion 31 which extends forward of the front wheel system. Projecting rearwardly from a lower part of the frame of the tractor and centrally disposed is a conventional draw bar 32. As will be described in more detail below, the mounting means 22 for the side swather head 21 is attached to the tractor at the rear, and more particularly to the rear axle 30 and the draw bar 32 so that the weight of the inner end of the side swather head is carried at the rear of the tractor 25. The front swather head is carried entirely by the front of the tractor as it is attached to the front frame portion 31 of the tractor.

The swather 20 may include its own separate hydraulic system having a hydraulic pump (not shown) connected to and driven by the conventional PTO shaft which projects from the rear of the tractor above the draw bar 32. A fluid reservoir for the hydraulic system can be provided in one of the structural members in the form of a hollow box member, such as transverse member 36 of drawing means 35 which will be described in more detail below.

The overall structure of the side and front heads 21 and 22 will only be described generally because it does not form part of the present invention. The side head 21 has a main elongated frame 39 which extends the length of the head, and a swathing component 37 is mounted in front of the frame 36 and is connected thereto as at pivot connection 38, which allows the swathing component 37 to pivot about a horizontal axis so as to be raised and lowered relative to the ground. The front head 23 also has a swathing component 40, and it is pivotally connected by a connection 41 to a sub-frame 42 which is of less length than that of the swathing component 40.

The swathing components 37 and 40 are moved between various heights by way of hydraulic cylinders, one of which is shown for the front head, for example, at 43 in FIG. 7, and in this arrangement, the cylinder 43 is connected between a lower part of the sub-frame 42 and the swathing component 40, whereby on expansion of the cylinder 43, the swathing component is pushed to a more raised position, the pivoting taking place about the horizontal pivot axis of the connection 41. Control valves for the cylinder 43, as well as for a similar cylinder of the side head 21, are preferably located within the cab of the tractor.

Each head is also provided with a sickle bar along its front lower edge, such as that shown at 44 for the front head in FIG. 7. Mounted above the sickle bar is a reel, such as that shown at 45 for the front head. The height of the reel relative to the sickle bar my be adjusted by hydraulic means (not shown). Both heads are also provided with conveying beds so that the cut grain is conveyed to a particular location of the head for dumping into a wind row. For example, in the arrangement shown in FIG. 1 the front head 22, which has its right end substantially aligned in front of the inner end of the side head 21, may deposit all of the grain cut thereby behind it and immediately to the left of its right end. The conveying bed of the side head, on the other hand may be designed to give the option of depositing all of the grain it cuts at its left hand end so that the two heads form one large wind row which will be to the immediate right of the tractor wheels. The reels, sickle bars and conveying beds of the heads may be driven by hydraulic motors, and as well, the mechanism for adjusting the position of the reels my be actuated by a hydraulic cylinder. All of such hydraulic means are preferably individually controlled from the tractor cab.

Referring to FIGS. 1 and 2, it can be seen that the end of the side head 21, which is most remote from the tractor 25, i.e., its outer end, is supported by ground engaging means 47. The ground engaging means 47 is shown in the form of a pair of caster wheels 48 mounted on a vertical spindle 51 so that the can pivot about a vertical axis. Affixed to the spindle 51 is a laterally extending steering arm 52. A power actuated means in the form of a hydraulic, double acting cylinder 53 is pivotally connected at one end to the frame 39 and at its other end to the arm 52. Thus, on expansion of the cylinder 53 the pair of caster wheels 48 are rotated about the axis of the spindle 51 to a position in which the axis of rotation of the wheels is normal to the direction of travel of the implement. On retraction of the cylinder 52, the pair of caster wheels are through about 90° so as to be in a position for transport of the swather as will be described in more detail below.

In the illustrated embodiment of the invention, the inner end of the side swather head 21 is supported solely by the mounting means 22 (FIG. 1), which includes the rigid drawing means 35 and a connection member 55. The transverse member 36, which extends transversely immediately behind the tractor when the swather is in its normal working condition may be formed by a member of hollow box section closed at both ends to form the hydraulic reservoir as previously explained. Affixed to the transverse member 36 and projecting forwardly therefrom is a pair of members 56 which are also formed of a box section having open forward ends. Rigidly attached to the rear axle 30 on opposite sides of the main body portion 27 of the tractor 25 is a pair of clamp mechanisms 57 which have rearwardly projecting solid members 60 of outer cross section shape for close reception within the open end of members 56. At the rear end of each of the members 56 there is provided a transverse shaft 61 which extends between side walls of the box section, and in the rear end of each of the members 60, there is provided a horizontal transverse slot 62 (FIG. 3) positioned to receive the shaft as the forward end of the members 56 are slid over the rearward ends of rearwardly projecting members 60. The members 56 have in top and bottom walls thereof aligned rectangular openings 63 and 64. The rear ends of members 60 also have vertically aligned openings 66 and 67, which, when the shaft 61 engages the inner end of the slot 62, align with the openings 63 and 64. A pin 65 of rectangular cross section and tapered at its lower end can be driven into aligned openings 63, 64 and 66, 67 when the forwardly projecting members 56 are to be attached to rearwardly projecting members 60 so as to lock the drawing means 35 to the rear of the tractor.

In addition to being attached to the tractor by the above described mating of members 56 and 60, there is provided below and spaced parallel to transverse member 36, a bar 68 for connection to the rear end of the tractor draw bar 32 by way of a pin 69 which is inserted into the conventional openings at the rear end of the draw bar and an aligned hole in the bar 68.

As will be explained in more detail below, when it becomes desirable to place the side swather head in a particular form of transport condition, the drawing means 35 can be disconnected from the rear of the tractor by withdrawing the pins 65 and also the pin 69 from the draw bar. In fact, when swathing has been completed and it becomes necessary to permanently dismount the swather from the tractor until the following swathing season, the drawing means can be disconnected in this same manner as it is not essential that the clamp mechanisms 57 be removed from the tractor rear axle.

The connection member 55 is a rigid member formed by two legs 71 and 72 joined at inner ends and projecting from each other at an angle, which in the illustrated embodiment is about 90°. The connection between the two legs is a rigid one, and as shown, the connection is reinforced by triangular plates 75 but the outer ends of the two legs 71 and 72 are connected to the drawings means and the frame 39 by pivot connections 73 and 74, respectively. The pivot connections 72 and 73 each provide for pivot about vertical axis, and one of the pivot connections, in the present case, pivot connection 72, also provides for pivot about a horizontal axis. More specifically, there is affixed to transverse member 36 a pair of vertical spaced lugs or plates 77 which project rearwardly from the transverse member 36 which receive the outer end of leg 72. The leg is pivotally connected to the plates 77 by a vertical pin 78 received in aligned bores in the plates 77 and a bushing member 80. Affixed to bushing member 80 is a horizontal bushing member 81 (FIG. 1) which receives a transverse pin 82 also received in spaced horizontal lugs 83 formed at the outer end of the leg 71. Thus, a universal connection is provided to allow for pivoting of the leg 71 in a vertical plane relative to the drawing means 35. The pivot connection 74, on the other hand consists of a vertical pin 84 received in aligned openings in vertical spaced lugs 85 which project from the end of frame 39 of the side swather head 21 and in a vertical bore in the outer end of the leg 72. The pivot connection 74 therefore allows pivoting only about a vertical axis.

The connection member is normally prevented from pivoting about the vertical axis of the pivot connection by an additional connection means 86 (FIG. 4) which in effect provides a connection between the end of transverse member 36, which is at the side of the tractor on which the side swather head is mounted. The connection means 86 includes a link 87 which is connected to the transverse member 36 by a horizontal pivot pin 92 at its forward end. Adjacent the connection between legs 71 and 72 and at the forward side thereof, there is provided an open front pocket 88 adapted to receive the rear end of the link 87. The forward edges of the pocket 88 are flared so as to act as a guide for the rear end of the link 87 as the tractor is backed up in the operation of locking the connection member in its working position as shown in the upper position of FIG. 4. The rear end of the link 87 is provided with a transverse bore which aligns with bores in the walls of the pocket 88 when the rear end of the link is fully received in the pocket. Located adjacent one side of the pocket 88 is a hydraulic cylinder unit 90, which has a pin 91 formed on the outer end of the piston rod thereof. The pin 91 is aligned with the bores in the walls of the pocket 88 so that as the cylinder unit 90 is expanded, the pin is thrust into the bores. Thus when the rear end of the link 87 is in the pocket 88 and the cylinder unit is activated to expand, the rear end of the link becomes locked to the connection member 55 by the pin 91. Alternatively, when it becomes desirable to move the side head to a transport position, the cylinder unit is activated, preferably by a control valve located within the cab of the tractor, to contract the cylinder unit 90 to cause withdrawal of the pin 91. The cylinder unit 90 may be hydraulically hooked in parallel with the hydraulic cylinder 53 so that as the pin is withdrawn by the hydraulic unit 90, the hydraulic cylinder is activated to turn the caster wheels to a transport position. When the pin 91 has been withdrawn, forward motion by the tractor allows the connection member 55 to swing about the pivot pin 78 to a trailing position as indicated by the arrow 93 in FIG. 4 so that the side head is behind the tractor as shown in FIG. 8.

There is provided between the frame 39 of the side swather head 21 and the connection member 55, a detachable connection member or strut 94 which normally prevents any turning motion of the side head 21 relative to the connection member 55 about the pivot pin 84. One end of the strut, i.e., its outer end is pivotally connected to the frame 39 by a removable pin 96 placed in aligned holes in the lugs of a bracket 95 affixed to the back of the frame 39 and a bore in the outer end of the strut. The strut has its inner end pivotally fastened to the connection member 55 at a location adjacent the connection of the legs 71 and 72 by way of a pivot pin 98 received in aligned bores in lugs 97 which are formed on the connection member 55 and a bore in the inner end of the strut 94. There is provided at a location on frame 39 between the bracket 95 and the pivot connection at the inner end of the frame 39 a second bracket 100 of the same structure as bracket 95. When pin 96 is removed from bracket 95 where it is retained when the side head is in the operative position (FIG. 1) or in one mode of transportation (FIG. 9), and the connection member 55 is pulled to a position in which the leg 72 of the connection member 55 is aligned with the frame 39, the pin 96 can be replaced in bracket 100 to lock the strut 94 in the position shown in FIG. 10 so that the leg 72 and frame are retained in the aligned relation.

The sub-frame 42 of the front swather head, which is best shown in FIGS. 5 and 6, in the main consists of an upper transverse member 101 and a lower transverse member 102 joined by a pair of vertical or upright end members 103. All of members 101, 102 and 103 may be formed of box sections, and transverse member 101 and upright members 103 may be in the same vertical frame with lower transverse member 102 being in front of the uprights 103. Heavy bushing member 104 is secured in front of upper transverse member 101 at the centre thereof, the bushing member 104 forming part of the pivot connection 41 between the swathing component 40 and the sub-frame 42 (FIG. 1). The sub-frame 42 normally remains connected to the swathing component 40 and is adapted to be removed from the part of the front head mounting means 24 which may remain permanently attached to the tractor.

The part of the mounting means for the front head which remains attached to the tractor includes upper channel member 105 and lower channel member 106 spaced in the vertical direction a distance equal to the vertical spacing of the transverse members 101 and 102 of the sub-frame 42. The upper and lower channels 105 and 106 are joined by a pair of upright members 107 and are provided with rearwardly projecting support members 108 behind upper channel member 105 for attachment to the front of the forward frame portion 31 of the tractor 25. Another pair of support members 109 project rearwardly from the lower channel 105 and are provided with means at the rearward end thereof for attachment to the sides of the forward frame portion.

The upper channel 105 is open at the front and is shaped to receive upper transverse member 101 of the sub-frame 42. Positioned in front of the transverse member 101 is a pair of rollers 111 mounted for rotation about vertical axis provided by the removable pins 112 which pass through aligned openings in the upper and lower flanges of the channel 105. Thus, the upper transverse member is prevented from moving out of the channel 105 by the rollers but it is free to move longitudinally within the channel. The pins 112 can be withdrawn upwardly and the rollers removed when it is desired to separate the sub-frame 42 from the means permanently mounted on the front of the tractor. Mounted in the lower channel, which is also open at the front is a pair of rollers 113 rotatable about vertical axis on shafts 114. The rollers 113 are disposed at opposite ends of the lower channel 106 and the surfaces of the rollers are exposed in front of the channel so as to engage the lower transverse member 106 which bears thereagainst when the front head is mounted (FIG. 6). As can be seen in FIG. 5, there is provided between support 109 and a bracket 115 projecting rearwardly from upright member 103 at one end of the sub-frame 42 a power actuated means in the form of a hydraulic cylinder 116. On actuation of the cylinder 116 by control means accessible in the cab of the tractor so as to expand or contract the cylinder, the sub-frame is shifted longitudinally in the channel 105 so that the relative lateral position of the front swather head can be varied. Such shifting of the front head affects the relationship of the alignment between the right end of the front swather head and the inner end of the side swather head. it is desirable, for example, to increase the overlap between these two ends of the respective swathers when the swather is negotiating a turn so as to avoid missing a strip of standing grain.

During normal swathing operations, the front and side swathing heads 21 and 22 are maintained in the positions shown in FIG. 1 and when it becomes desirable to move to another site which is not at a great distance and may not, for example, require a significant amount of road travel, cylinder unit 90 and cylinder 53 are activated so that link 87 releases connection member 55 and the caster wheels 51 are turned through approximately 90°. Thus, on forward movement of the tractor 25, the side swather head 21 swings to the trailing position shown in FIG. 8, the turning action taking place about the pin 87. For this mode of transport, the front head is only moved to its raised position, and accordingly, the swather has the width of the front swather head. When the new swathing site is reached, the tractor is backed up and turned so as to cause the side swather head to resume its operating position at which time the necessary hydraulic control valves are activated in the tractor cab to cause the caster wheels to lock in the work position and the pin 91 to move to the link locking position.

When it becomes necessary to move the swather a greater distance and/or where there are definite width restrictions, the side head is again moved to the trailing position in the manner described above (FIG. 9), but the front swather head 23 is removed and adapted for being pulled behind the side swather head 21. To permit this type of transport of the front swather head 23, there is provided a transport carriage 120 (FIG. 7), including an axle 121 equipped at opposite ends thereof with removable hubs and spindles 122 on which are mounted wheels 123. Mounted below the axle 121 adjacent one end thereof is and implement jack 124, and near the same end is an upwardly projecting lug 125 which is positioned to mate with downwardly projecting lugs formed under one end of the lower transverse member 102 of the sub-frame of the front swather head. As will be described in more details below. the lugs 125 and 126 are provided with openings which align when the front head is being removed from the tractor so that a pin 127 can be inserted for attaching the head to the head to the transport carriage. Also mounted on the axle 121 is a slide member 129, the position of which on the axle is adjustable by a screw member 128 which passes through an upstanding lug 130 on the top surface of the axle, i.e., turning of the screw member 128 in opposite directions moves the slide member back and forth on the axle. A rigid link 131 is connectable between the slide member 129 and bracket 132 at one end of the upper transverse member, the connection at opposite ends being of a pivot type provided by pins 133 and 134.

To install the carriage below the front head 21, the hub and spindle 122 is removed from the left hand end of the axle as shown in FIG. 7, and the axle is slid under the front head so that the end of the axle is under the sub-frame 42 which is still mounted on the front of the tractor. The link 131 is installed by inserting pins 133 and 134 in opposite ends thereof so that it is connected to the slide member 131 at its lower end and to the sub-frame at its upper end. The screw member is then adjusted to force the slide member away from the lug 129 and thus bring the link 131 into engagement with the swathing component 40 so as to assume the weight of the head and make it possible to raise the head further to a more balanced condition on the carriage. The jack 124 is worked to raise the end of the axle to a position to enable the hub and spindle 122 and the wheel 123 to be mounted on the end of axle 121. The pin 127 is also inserted to fasten the axle to the lower portion of the sub-frame 42. Additionally, a stabilizing link 135 (FIG. 9) is connected between the opposite end of the axle 121 and the end of the sub-frame opposite to the downwardly projecting lug 126.

The outer end of the side swather head 21 is provided with a hitch member 136, and a hitch and jack combination 137 is provided for detachable connection to one end of the front swather head 23. Thus, the front swather head, when mounted on the transport carriage 120 can be attached for two behind the side swather 21 after it has been moved to its transport position as shown in FIG. 9. As is apparent from the drawings, in this second mode of transport, in which the tractor is still used as the prime mover, the swather is suitable for road travel and can also pass through narrow areas, such as gateways. It will be apparent that the front swather head can be remounted on the tractor from the carriage 120 by substantially reversing the above described procedure when the new swathing site has been reached. Once the front swather head has been mounted, the side swather head can be returned to its operative position in the manner described above.

Yet a third mode of transport can be achieved which allows travel over long distances and towing by a truck, rather than the tractor, and in this regard, reference is made to FIG. 10. For this condition, an addition hitch and jack combination 140 is provided, which is initially placed under the frame 39 of the side swather head 21. The frame of the side swather head, like the front swather head, is equipped on its underside with means for attachment to a transport carriage 120a of its own. With the side swather head jacked up as just described, the carriage is installed under the head in much the same manner as discussed in connection with the front swather head. The design of the hubs and wheels used on the caster wheel set can be such that carriage 120a does not have its own hubs and wheels, but utilizes those of the caster set once the swather has been jacked up to install the carriage 120a. As shown in FIG. 10, the wheels and hubs have been removed from the caster wheel set. The drawing means 35 is them removed from the rear of the tractor 25, without the link 87 having been unlocked, by withdrawing pins 65. Pin 96 is withdrawn and the connection member is swung so that leg 72 aligns with the frame 39. The parts are locked in this position by reinserting pin 96 in the end of link 94 and the openings in bracket 100. The hitch and jack combination 140 is then removed from its jacking position and detachably mounted by means (not shown) to the side of leg 71 which has now become the front side of connection member 55. The jack portion of the combination can be used to support the front end of the side swather head when the head is not attached to a vehicle.

The front swather head 23 can be prepared for transport in the same manner previously described and connected to the rear of the side swather head 21 is previously described. Thus both heads can be pulled together by a truck or other vehicle which connects to the hitch and jack combination at the front of the side swather head. Once at a site for swathing, the heads can be remounted on a tractor by substantially reversing the above described demounting procedure.

Although only one embodiment of the invention has been disclosed, various alternatives and modifications will be obvious to those skilled in the art without departing from the spirit of the invention as defined in the accompanying claims.

What we claim is:

1. A swather for mounting on a tractor comprising:
   a rigid drawing means including a transverse member and forwardly projecting members connected to said transverse member and having connecting means at forward ends for rigid connection to a frame portion of the tractor with said transverse member having an intermediate portion disposed behind the tractor,
   a side swather head for mounting at one side of the tractor and in a working position projecting from the tractor forward of said transverse member perpendicular the direction of travel,
   said swather head including an elongated rigid frame supported at an outer end thereof by ground engaging means,
   a connection member for connecting an inner end of said rigid frame to said transverse member of said drawing means and normally supporting said inner end and retaining said side swather head in said working position,
   said connection member including a pair of legs rigidly connected at inner ends and projecting at an angle relative to each other, one of said legs being connected at the outer end thereof to the intermediate portion of said transverse member and extending to said one side of the tractor, the other leg extending forwardly from the connection with said one leg and being connected at the outer end thereof to said inner end of said frame of said swather head for providing the support of said inner end of said swather head.

2. A swather as defined in claim 1, wherein said one leg member extends rearwardly and outwardly to said one side at an oblique angle relative to the direction of travel, said other leg extending forwardly and further outwardly from the connection to said one leg member and at an oblique angle relative to the direction of travel.

3. A swather as defined in claim 1, wherein pivotal connection means is provided between the outer end of said connection member and the intermediate portion of said transverse member for allowing turning of said connection member relative to said transverse member about a substantially vertical axis, and further comprising additional connection means detachably connecting said transverse member to said connection member for normally preventing pivoting of said turning of the connection member relative to said transverse member whereby on detachment of said additional connection means said side swather head is free to swing from said work position to a trailing transport position.

4. A swather as defined in claim 3, wherein said additional connection means includes a link connected at a forward end to said transverse member at a point toward said one side from the intermediate portion thereof and connected at a rear end to said connection member.

5. A swather as defined in claim 4, wherein pivotal connection means is provided between the outer end of said other leg and said inner end of said frame of said swather head for permitting turning of said swather head about a vertical axis relative to said connection member, and further comprising detachable connection means between said frame of said swather head and said connection member normally preventing the turning of said swather head relative to said connection member.

6. A swather as defined in claim 5, wherein said detachable connection means between said frame and said connection member includes a rigid link connected at one end to an anchor point on said frame and connected at the other end to an anchor point on said connection member to thereby hold said swather head in said work position, the connection at one anchor point permitting selective disconnection of the link at one end thereof.

7. A swather as defined in claim 6, wherein the connection at the other anchor point is pivotable, and further including another anchor point adjacent the disconnectable pivot connection for providing an alternative connection of said one end of the link to thereby lock said swather head in a turned non-working position relative to the other leg of said connection member.

8. A swather is defined in claim 7, wherein said other leg is in alignment with said frame of said swather head in said non-working position.

9. A swather as defined in claim 8, wherein said one leg of said connection member has means for connection on a hitch bar for use in drawing said swather head lengthwise when said swather head is in a non-working position.

10. A swather as defined in claim 9, and further including a detachable wheeled transport carriage including an axle for connection below said frame and extending transversely to the elongated frame for movement of said head when in said non-working position.

11. A swather as defined in claim 5, wherein one of said pivotal connection means between said connection member and said transverse member and between said connection member and said frame also provides pivoting movement about a horizontal axis.

12. A swather as defined in claim 4, wherein said link is rigidly connected to and projects rearwardly of said transverse, said connection member having means receiving a rear end of said link, and pin means engaging said rear end of said link and said receiving means for detachably connecting said link and said connection means.

13. A swather as defined in claim 12, wherein said receiving means is a pocket shaped to receive the rear end of said link in a seated condition in said connection member, said pocket and link having aligned openings in said seated condition, and power actuated pin means for receipt in the aligned openings.

14. A swather as defined in claim 13, wherein the ground engaging means at the outer end of said swather head includes caster wheel means, and further including means connecting said wheel means to said frame for allowing turning of said wheel means about a vertical axis whereby said wheel means are movable to a work position to permit travel of said swather head in the work position in a direction normal to the longitudinal axis of the swather head and are movable to transport position to permit travel of said swather head in a direction substantially in the longitudinal direction.

15. A swather as defined in claim 14, wherein said caster wheel means includes power actuated steering means for moving said wheel means between said work and transport positions.

16. A swather as defined in claim 15, and further including control means for initiating operation of said power actuated steering means for moving said wheel means to said transport position on actuation of said power actuated pin means for disconnecting said link from said connection member.

17. A swather as defined in claim 1, wherein said transverse member of said drawing means includes means for connection to a draw bar of said tractor.

18. A swather as defined in claim 17, and further comprising mounting means for attachment to a rear axle of the tractor, said forwardly projecting members of said drawing means having means for cooperating with said mounting means and allowing ready detachment of said drawing means.

19. A swather as defined in claim 1, wherein the angle between the two legs of said connection means is substantially 90°.

20. A swather as defined in claim 1, and further comprising a front swather head, and means for detachably connecting said front swather head in front of the tractor with one end of said head substantially aligned in front of the inner end of said side swather head, said means connecting said front swather head being separate from the drawing means for mounting said side swather to said tractor.

21. A swather as defined in claim 20, wherein said front swather head includes an elongated transverse frame and a sub-frame assembly carrying said frame of said front swather head in front thereof, and mounting means for affixing to a front frame portion of said tractor, said mounting means having releasable connecting means for receiving said sub-frame assembly for thereby mounting said front swather head on said tractor.

22. A swather as defined in claim 21, wherein one of said mounting means and sub-frame assembly includes a transverse channel member and the other includes and elongated member received in said channel member whereby adjustment of one of said channel and elongated members longitudinally with respect to each other allows for lateral repositioning of said front swather head.

23. A swather as defined in claim 22, and further including power actuated means for shifting said front swather head transversely in either direction relative to said tractor.

24. A swather as defined in claim 22, wherein channel member is a transverse open-front member forming part of said mounting means, and said elongated member is an upper transverse member of said sub-frame assembly, and further including removable means in the open-front of said channel for permitting only longitudinal movement of said elongated member within said channel member.

25. A swather as defined in claim 24, wherein said removable means includes rollers mounted on vertical pins.

26. A swather as defined in claim 25, wherein said sub-frame assembly includes a lower transverse member spaced below and parallel to the upper transverse member, said mounting means including a lower rollers means mounted for rotation about vertical axis and engagable by said lower transverse member.

27. A swather as defined in claim 20, and further comprising a wheeled transport carriage including an axle attachable to said sub-frame assembly of said front swather head and extending transversely under said front swather head.

28. A swather as defined in claim 27, and including jack means for raising said front swather head during dismounting of said front swather head from the mounting means on said tractor, and connecting means for connection of said sub-frame to said transport carriage when raised by said jack means.

29. A swather as defined in claim 27, and further comprising means on said axle of said transport carriage for engagement with said front swather head and adjusting the position thereof relative sub-frame assembly.

30. A swather as defined in claim 21, and further including hitch means on the outer end of said side head and mating hitch means on one end of said front assembly whereby said front swather head may be pulled being said side swather head.

31. A swather as defined in claim 30, wherein the hitch means of said front swather head includes supporting jack means, and said hitch means is detachable from said front head.

* * * * *

UNITED STATES PATENT AND TRADEMARK OFFICE
CERTIFICATE OF CORRECTION

PATENT NO. : 4,768,334

DATED : September 6, 1988

INVENTOR(S) : Gregory J. Honey et al

It is certified that error appears in the above-identified patent and that said Letters Patent is hereby corrected as shown below:

Col. 7, line 55, change "it" to --It--;
Col. 9, line 1, change "two" to --tow--;
Claim 30, Col. 12, line 63, change "being" to --behind--.

Signed and Sealed this

Twentieth Day of December, 1988

*Attest:*

DONALD J. QUIGG

*Attesting Officer*      *Commissioner of Patents and Trademarks*